United States Patent [19]

Bleeck

[11] Patent Number: 4,606,503

[45] Date of Patent: Aug. 19, 1986

[54] PROCESS FOR WET GRINDING OF NATURAL AND SYNTHETIC CARBONATES

[75] Inventor: Joerg A. Bleeck, Tigard, Oreg.

[73] Assignee: Columbia River Carbonates, Woodland, Wash.

[21] Appl. No.: 561,153

[22] Filed: Dec. 13, 1983

[30] Foreign Application Priority Data

Dec. 14, 1982 [DE] Fed. Rep. of Germany ....... 3246232

[51] Int. Cl.$^4$ .......................... B02L 1/00; B04B 15/04
[52] U.S. Cl. ......................................... 241/16; 241/21
[58] Field of Search ................. 241/15, 16, 21, 101 D, 241/22; 252/179, 453, 455

[56] References Cited

U.S. PATENT DOCUMENTS

| | | | |
|---|---|---|---|
| 3,604,634 | 9/1971 | Windle | 241/16 |
| 4,193,791 | 3/1980 | Weston | 75/2 |
| 4,310,360 | 1/1982 | Kuant | 241/16 X |

FOREIGN PATENT DOCUMENTS

| | | |
|---|---|---|
| 1161010 | 12/1984 | Canada . |
| 0016344 | 10/1980 | European Pat. Off. . |
| 0027996 | 5/1981 | European Pat. Off. . |
| 3014620 | 10/1981 | Fed. Rep. of Germany . |
| 1309074 | 3/1973 | United Kingdom . |

OTHER PUBLICATIONS

Gessner G. Hawley, "The Condensed Chemical Dictionary" 10th edition, pp. 1105 and 1106.
Anderson, et al., "CaCO$_3$ Fillers: Selection, Use in Alkaline Papermaking Systems", *Pulp & Paper* (Oct. 1983), pp. 82–85.
Hagemeyer et al., "Natural Calcium Carbonate for Alkaline Paper", Tappi 64:97–100 (1981).
Sutermeister, *Chemistry of Pulp and Paper Making*, (New York, 1948), pp. 383–386.

*Primary Examiner*—Howard N. Goldberg
*Assistant Examiner*—Timothy V. Eley
*Attorney, Agent, or Firm*—Klarquist, Sparkman, Campbell, Leigh & Whinston

[57] ABSTRACT

The invention relates to a process for wet grinding of natural and/or synthetic carbonates in wet suspensions in which the viscosity of the mass is decreased and a favorable particle size range distribution is obtained having a small portion of very fine overground particles. The carbonates in the wet grinding are mixed with zeolites to 0.05 to 3.0% by weight based on the dry weight of the carbonates. Chemical dispersants are used to help effect the process.

17 Claims, No Drawings

PROCESS FOR WET GRINDING OF NATURAL AND SYNTHETIC CARBONATES

BACKGROUND OF THE INVENTION

The present invention relates broadly to a process for wet grinding of natural and synthetic carbonates, as, for example, calcium carbonate in wet suspension systems.

The milling of calcium carbonate in the mineral processing industry is steadily increasing to produce, for instance, fillers suitable for paper filling and coating. In practice of this technology fine, fractured calcium carbonate particles are manufactured by specially developing grinding mills in order to obtain composite particles containing 90% below 2 micron diameter sizes. These mills grind the calcium carbonate in slurry form generally containing about 70% by weight of solid content.

This high solids content is necessary in order to get good grinding performance and is also the result of consumer preferences with respect to many applications for the finished product. However, the viscosity of the slurry rises along with increased solids content. This increase in viscosity increases the energy requirement for the grinding process and causes other problems.

In order to facilitate the grinding it has been customary and necessary to add certain amounts of chemical dispersants, for example, those based on polyacrylates, polyphosphates or polycarbonic acids. These chemical dispersants favorably decrease the viscosity of the slurry but, unfortunately, do so only to a limited extent. Although the viscosity initially decreases upon addition of the dispersant, a point is reached beyond which increased amounts of dispersant no longer reduce the viscosity of the slurry but actually causes it to rise. A further disadvantage in using higher amounts of dispersants in the process is that the dispersants promote the growth of bacteria which can result in spoilage of the slurry. Biocides may then be required to control growth of the bacteria. High concentration of dispersants decrease the retention of the carbonate when used as a filler in paper products manufacturing and thus increases the need for using retention agents in the paper manufacturing process. The waste water developed during the process also becomes contaminated to an increased extent when greater amounts of dispersants are used. The present invention provides solutions to the above mineral milling processes as noted in the succeeding section.

SUMMARY OF THE INVENTION

The present invention provides a method which reduces the viscosity of carbonate slurries by addition of zeolite to the grinding slurry. The viscosity of such a slurry may be reduced by addition of dispersants to a level unattainable when dispersants are used alone. This reduction of viscosity not only saves energy in the grinding process but is also believed to result in a more uniform distribution in particle size in the grinding product together with a reduction in the proportion of overground, fine particles. Since the inclusion of zeolite in the grinding slurry results in a reduced viscosity, the amount of dispersants may be reduced or the concentration of carbonate in the slurry may be increased.

Reduced use of dispersants in the grinding process as provided by the present invention is highly desirable. Such reduction not only reduces the risk of bacterial growth in the slurry and the need for bacteriocides, but also reduces the need to add retention agents in such processes as paper manufacturing and reduces the concentration of the dispersants in waste water.

DETAILED DESCRIPTION OF THE PREFERRED EMBODIMENTS OF THE INVENTION

In accordance with this invention a method was discovered to significally decrease the viscosity of the carbonate slurries below that obtained by prior art, to achieve high solids content in the slurry and to reduce the need for dispersants in the grinding process. In addition, it is believed that the process of the present invention results in a narrower range of overground fine particles.

It has been discovered that the viscosity of carbonate slurries can be reduced by addition of natural or synthetic zeolite. As a result, desirable low slurry viscosities can be obtained, even at relatively high carbonate concentrations with reduced amounts of dispersants. In addition, it has been discovered that a lower minimum viscosity is obtainable by addition of dispersants to slurries containing zeolite than by slurries which do not contain the zeolite. As a result, the use of dispersants in the wet grinding of carbonates may be reduced or the concentration of carbonates in the slurry may be increased. Another noted advantage arising from the present invention is in favorably obtaining percentages of particles within more definite diameter sizes. Thus in this process the calcium carbonate in the aqueous suspension system, after suitable grinding, can be made to consist of not less than about 20% by weight of particle size of not more than 2 microns without containing significant amounts of undesirable overground particles of less than 0.2 microns.

It is believed that newly formed free positive ions released by the ion exchange capabilities of the zeolites may act to provide advantageous viscosity lowering effect in the slurry system. Zeolites, which contain sodium ions, are known ion exchange agents. When brought in contact with calcium ions (contained in the carbonates) in the aqueous slurry system an ion exchange reaction may take place. Presumably calcium ions become bound in the zeolite lattice and sodium ions are freed. Due to chemical valence differences, for each calcium ion taken up by the zeolite two equivalent sodium ions within the lattice network are released.

It has been shown that the process of this invention can be most advantageously employed with carbonate slurries having a suspension system has carbonate content of not less than 30% by weight and preferably at least 72% by weight. In order to reach the more desirable viscosity ranges in the slurry system it is sufficient to add portions of zeolite in the ranges of 0.05 to 3% by weight and preferably in the approximate range of 1% by weight.

The practice of this invention is described by the following examples for purposes of illustration. However, it is to understand that such detail is solely for that purpose and that variations can be made therein by those skilled in the art without departing from the spirit and scope of the invention.

Example 1 demonstrates the conventional practice and results of wet grinding calcium carbonate and Example 2 demonstrates, according to our invention, the practice and results of wet grinding of calcium carbonate with addition of zeolite.

EXAMPLE 1

Four hundred thirty grams of calcium carbonate of which a portion (99.99% by weight) consists of particles of less than 42 microns and a portion (32% by weight) consists of particles of less than 2 microns, was mixed with 250 milliliters of water and 0.05% by weight of a dry dispersant. The mixture was ground with a laboratory sand mill for 30 minutes.

After grinding the viscosity of the suspension was measured with a Brookfield viscometer at 100 rotations per minute and found to be 590 centipoises.

EXAMPLE 2

Four hundred thirty grams of calcium carbonate of which a portion (99.99% by weight) consists of particles of less than 42 microns and a portion (32% by weight) consists of particles less than 2 microns, was mixed with 250 milliliters of water, 0.05% by weight of a dry dispersant, and 4.3 grams zeolite. The mixture was ground with a laboratory sand mill for 30 minutes.

After grinding the viscosity of the suspension was measured with a Brookfield viscometer at 100 rotations per minute and found to be 320 centipoise.

It is thus seen that the addition of the zeolite to the slurry has resulted in a dramatic reduction of the viscosity of the slurry.

What is claimed is:

1. A method of wet grinding carbonates comprising the steps of:
    forming a slurry by combining a carbonate, water and a zeolite for reducing the viscosity of said slurry; and
    wet grinding said slurry.

2. The method of claim 1 further comprising the step of adding a dispersant to said slurry.

3. The method of claim 2 wherein said dispersant is selected from the group consisting of polyacrylate, polyphosphate or polycarbonic acid dispersants.

4. The method of claim 1 wherein the concentration of carbonate in said slurry is at least 30%.

5. The method of claim 1 wherein the concentration of carbonate in said slurry is at least 72%.

6. The method of claim 1 wherein the dry weight of said zeolite comprises between 0.05% and 3% of the dry weight of said carbonate.

7. The method of claim 1 wherein the dry weight of said zeolite comprises approximately 1% of the dry weight of said carbonate.

8. A method of reducing the viscosity of a carbonate slurry comprised of carbonate and water, the method comprising:
    providing, in a slurry containing a carbonate, an amount of a zeolite sufficient to reduce the viscosity of said slurry.

9. The method of claim 8 further comprising the step of providing a dispersant in said slurry.

10. The method of claim 9 wherein said dispersant is selected from the group consisting of polyacrylate, polyphosphate and polycarbonic acid dispersants.

11. The method of claim 8 wherein the dry weight of said zeolite comprises at least 0.05% of the dry weight of said carbonate.

12. The method of claim 8 wherein the dry weight of said zeolite comprises approximately 1% of the dry weight of said carbonate.

13. The method of claim 8 wherein said slurry is paper pulp slurry which contains a carbonate.

14. A slurry containing, in aqueous suspension, a filler suitable for paper filling or coating, the slurry comprising:
    water;
    a carbonate; and
    an amount of a zeolite sufficient to reduce the viscosity of a slurry containing said carbonate.

15. The slurry of claim 14 further comprising paper pulp.

16. A method of wet grinding carbonates comprising the steps of:
    forming a slurry by combining water,
        a carbonate in an amount sufficient to provide a slurry that is at least 30% carbonate,
        a zeolite, the dry weight of said zeolite being between 0.05% and 3% of the dry weight of said carbonate, and
        a dispersant selected from the group consisting of polyacrylate, polyphosphate, polycarbonic acid, and mixtures thereof; and
    wet grinding said slurry.

17. A method of reducing the viscosity of a carbonate slurry comprising, providing in a slurry containing a carbonate:
    an amount of a zeolite sufficient to reduce the viscosity of said slurry, the dry weight of said zeolite being between 0.05% and 3% of the dry weight of carbonate in said slurry; and
    a dispersant selected from the group consisting of polyacrylate, polyphosphate, polycarbonic acid, and mixtures thereof.

* * * * *